(12) United States Patent
Watson et al.

(10) Patent No.: US 11,044,177 B2
(45) Date of Patent: Jun. 22, 2021

(54) SECURE WIRELESS VEHICLE PARAMETER STREAMING

(71) Applicant: Panasonic Avionics Corporation, Lake Forest, CA (US)

(72) Inventors: Philip Watson, Lake Forest, CA (US); Steven Bates, Mission Viejo, CA (US); Samuel Jester, Lake Forest, CA (US); Grant Edward Burrows, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 59 days.

(21) Appl. No.: 16/231,758

(22) Filed: Dec. 24, 2018

(65) Prior Publication Data
US 2020/0204464 A1 Jun. 25, 2020

(51) Int. Cl.
| H04L 12/26 | (2006.01) |
| H04L 29/08 | (2006.01) |
| B64D 11/00 | (2006.01) |
| G07C 5/00 | (2006.01) |
| H04L 29/06 | (2006.01) |

(52) U.S. Cl.
CPC ........ H04L 43/028 (2013.01); B64D 11/0015 (2013.01); G07C 5/008 (2013.01); H04L 63/0263 (2013.01); H04L 67/025 (2013.01); H04L 67/12 (2013.01)

(58) Field of Classification Search
CPC ... H04L 43/028; H04L 67/12; B64D 11/0015; G07C 5/008

USPC .................................................. 709/224
See application file for complete search history.

(56) References Cited

U.S. PATENT DOCUMENTS

| 2,959,459 | A | 11/1960 | Ryan |
| 3,075,192 | A | 1/1963 | Etal |
| 6,009,356 | A | 12/1999 | Monroe |
| 9,934,620 | B2 | 4/2018 | Byrd, Jr. |
| 10,553,120 | B2 * | 2/2020 | Schmutz .............. G08G 5/0021 |
| 2010/0152924 | A1 | 6/2010 | Pandit et al. |

(Continued)

FOREIGN PATENT DOCUMENTS

WO  2016162622 A1  10/2016

*Primary Examiner* — Wing F Chan
*Assistant Examiner* — Leon Y Tseng
(74) *Attorney, Agent, or Firm* — Perkins Coie LLP (57) ABSTRACT

An in-flight entertainment and communications (IFEC) system configured to stream vehicle operational parameters from avionics systems connected thereto. An avionics interface defines a node of an avionics bus, and the avionics systems are connectible to the avionics interface over the avionics bus to transmit aircraft operational parameters thereto as a raw stream of chronologically sequenced data elements. A data processor is connected to the avionics interface and a network interface, and is receptive to the aircraft operational parameters from the avionics interface. The data processor applies a variable filter that selectively passes a filtered data stream of aircraft operational parameters derived from the raw stream to a data storage device. The variable filter is defined by one or more filter parameters dynamically adjustable in response to changing conditions derived from the aircraft operational parameters. The filtered data stream is transmitted to the remote monitoring station.

20 Claims, 4 Drawing Sheets

(56) References Cited

U.S. PATENT DOCUMENTS

| | | | |
|---|---|---|---|
| 2012/0004804 A1* | 1/2012 | Beams | G01S 5/0027 |
| | | | 701/32.7 |
| 2013/0197725 A1* | 8/2013 | O'Dell | H04L 67/125 |
| | | | 701/14 |
| 2016/0036513 A1 | 2/2016 | Klippert et al. | |
| 2016/0176538 A1 | 6/2016 | Bekanich | |
| 2016/0285542 A1 | 9/2016 | Du | |
| 2016/0318622 A1* | 11/2016 | Haukom | G07C 5/0808 |
| 2017/0063944 A1* | 3/2017 | Nyikos | H04L 65/4069 |
| 2017/0134087 A1* | 5/2017 | Law | H04B 7/18506 |
| 2018/0007137 A1 | 1/2018 | Watson et al. | |
| 2018/0197357 A1 | 7/2018 | Haukom | |
| 2019/0109817 A1* | 4/2019 | Rogers | H04L 67/12 |

* cited by examiner

SECURE WIRELESS VEHICLE PARAMETER STREAMING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to communications systems, including those utilized in passenger vehicles. More particularly, the present disclosure relates to secure wireless vehicle parameter streaming.

2. Related Art

The flight of an aircraft can be defined according to a number of operational parameters at any given point in time, which at the most basic level include altitude, airspeed, heading, attitude. Basic instrumentation necessary for piloting the aircraft have provided readouts of such information, though early on in the development of aircraft and avionics, a need for recording this data was recognized. In addition to these basic operational parameters, more particular forms thereof such as ground speed in addition to indicated airspeed, pitch and roll attitude, and lateral, longitudinal, and vertical acceleration may be captured by different sensors. Status information specific to aircraft subsystems such as engines and fuel delivery, hydraulics and flight control surfaces, cabin environment, and the like may also be captured by sensors and other feedback modalities associated therewith. This information is understood to include the specifics of pilot inputs provided to the aircraft control systems, as well as the resultant conditions of that input. The foregoing will be recognized as merely an exemplary list of data that may be captured and reported by modern avionics systems. Indeed, U.S. laws currently require are over eighty eight (88) aircraft operational parameters to be recorded.

Detailed operational data is helpful in maintaining and improving safety with respect to the individual aircraft, over a fleet of aircraft operated by a carrier, the entire active fleet of a given aircraft type or model, and across commercial aviation in general. Data collection efforts were initially pursued with flight data recorders or "black boxes" that recorded a continuous, albeit a limited set of operational data intended for analysis in the event of an accident or incident. Initially, only time, airspeed, heading, altitude, vertical acceleration, and time of radio transmission were recorded. Typically, flight data recorders are combined with cockpit voice recorders that are used to record the audio in the cockpit environment. Because it is necessary for the recorded data to be recoverable after a catastrophic event, combined flight data recorder and cockpit voice recorders are built to withstand severe heat and impacts. Additionally, in order to assist recovery efforts, signaling beacons may be incorporated. An early implementation of a flight data recorder is disclosed in U.S. Pat. Nos. 2,959,459 and 3,075,192, both to Ryan. In recent implementations, the various signals and data from the individual avionics system are collected by a flight data acquisition unit (FDAU), then routed to the flight data recorder. Compared to the earlier limited data recorders, conventional systems capture over two thousand (2000) flight parameters.

Aircraft operational data recorded by and retrieved from the flight data acquisition unit may be utilized outside of the context of accident or major incident analysis. Based upon a routine analysis of the acquired data known in the art as Flight operational Quality Assurance (FOQA), problems can be identified and corrections can be implemented before there is an accident or major incident. Thus, improvements can be made in flight crew performance, air carrier training programs and operating procedures, air traffic control procedures, airport maintenance and design, an aircraft operations and design.

Conventionally, access to the data recorded by the flight data acquisition unit is provided via a quick access recorder (QAR) that connects to the aircraft data bus. Typically, this is an ARINC (Aeronautical Radio, Incorporated) 429 or 717 bus, the technical standard for which specifies a two-wire physical interface and a data transfer protocol governing the communications over the aircraft local area network. The QAR is understood to include a connector for the respective interface on the aircraft, and one or more of several known modalities for exchanging data with a general-purpose computer, such as a Universal Serial Bus (USB) interface or a memory card (Compact Flash) reader. Some QARs may incorporate wireless communications modules that may connect with base stations to transfer the data to a remote collection server.

Beyond collecting aircraft operational data with Quick Access Recorders, other systems with such functionality are known in the art. For example, U.S. Pat. No. 9,934,620 to Byrd, Jr. discloses wireless near real-time inflight data collection by way of an onboard communications hub, line replaceable unit that receives flight data from the digital flight acquisition unit. The onboard communications hub is understood to store some of the data received for future transmission, and broadcast the remainder in an encrypted format via an ultra-high frequency L-band antenna to enable crowd-sourcing retrieval.

Another example is disclosed by U.S. Pat. App. Pub. No. 2016/0318622 to Haukom, which is understood to describe an aircraft interface device that collects data at first and second frequencies, with the second frequency being higher and used when an anomaly condition is detected. The captured data may be transmitted off board the aircraft via a satellite communications link or an aircraft communications and reporting system (ACARS) datalink that relies on a radio or satellite link.

Still further, U.S. Pat. App. Pub. No. 2016/0285542 to Du is understood to disclose a mobile passenger entertainment and information system that incorporates a virtual black box or flight data recorder. The system is disclosed as including a control device that collects vehicle data, and also pushes the same to a ground-based remote storage via an Internet connection.

Another known system for collecting and transmitting flight parameter data is disclosed in U.S. Pat. App. Pub. No. 2010/0152924 to Pandit et al. This publication is understood to describe an electronic flight bag (EFB) that receives data from a quick access recorder, and connects to the in-flight entertainment system (IFE). The electronic flight bag may also implement functions of an ACARS data recorder and/or a cockpit voice recorder. The data retrieved from the quick access recorder is described as being stored or transmitted in real-time to ground personnel.

While the foregoing systems may represent improvements over conventional Quick Access Recorder-based data collection systems that otherwise require the manual connection of the device to the ARINC-429 bus interface and initiation of data retrieval procedures in between flights and during maintenance operations, there are several deficiencies. As indicated above, there is a substantial volume of data that can be captured from the avionics systems of a conventional aircraft, and this amount of data, particularly over daily or almost daily flight operations that can span multiple hours, multiplied by the number of aircraft in the fleet of a single operator, can be substantial to the point of being almost unmanageable. Accordingly, there is a need in the art for improvements in secure wireless vehicle parameter streaming.

BRIEF SUMMARY

The present disclosure is directed to the secure streaming of aircraft operational parameter data via an in-flight entertainment and communications (IFEC) system while the aircraft is in flight. This data may be utilized for managing maintenance procedures, route improvements, and/or incident analysis. Because such data is sensitive and unauthorized disclosure of the same is problematic for several reasons, the data is streamed encrypted. The avionics data may be filtered based upon local operating conditions of the aircraft, or a combined analysis of operating conditions of other aircraft flying within the vicinity. The filter can thus be dynamically updated.

One embodiment is a system for streaming vehicle operational parameters from vehicle subsystems. The system may include a vehicle subsystems interface defining a node of a vehicle data bus. The vehicle subsystems may be connectible to the vehicle subsystems interface over the vehicle data bus to transmit vehicle operational parameters thereto as a raw stream of chronologically sequenced data elements. The system may also include a data storage device, along with a data storage. There may also be a recording controller that is connected to the data storage device and to the vehicle subsystem interface to receive vehicle operational parameters therefrom. The recording controller may include a dynamic variable filter that selectively passes a filtered data stream of vehicle operational parameters derived from the raw stream to the data storage device for storage thereon. The dynamic variable filter may be being defined by one or more filter parameters. The system may also include a network interface in communication with a remote monitoring station over a data communications link. The system may further include a vehicle parameter streaming server that is connected to the data storage device and to the network interface. The filtered data stream of vehicle operational parameters may be retrieved from the data storage device for transmission to the remote monitoring station.

Another embodiment is directed to an in-flight entertainment and communications system configured to stream vehicle operational parameters from avionics systems connected thereto. The IFEC system may include an avionics interface defining a node of an avionics bus. The avionics systems may be connectible to the avionics interface over the avionics bus to transmit aircraft operational parameters thereto as a raw stream of chronologically sequenced data elements. There may be a data storage device, along with a network interface in communication with a remote monitoring station over a network. There may also be a data processor connected to the avionics interface and the network interface. The data processor may be receptive to the aircraft operational parameters from the avionics interface. Additionally, the data processor may apply a variable filter that selectively passes a filtered data stream of aircraft operational parameters derived from the raw stream to the data storage device for storage thereon. The variable filter may be defined by one or more filter parameters dynamically adjustable in response to changing conditions derived from the aircraft operational parameters. The filtered data stream may being transmitted to the remote monitoring station.

Still a different embodiment is directed to a non-transitory computer readable medium connected to an in-flight entertainment and communications (IFEC) system that includes instructions executable by the IFEC system for performing a method of streaming aircraft operational parameters from one or more avionics systems. The method may include a step of receiving avionics data from an avionics interface to which the one or more avionics systems are connected. The avionics data may be generated by the one or more avionics systems, and may be received as a stream of chronologically sequenced data elements. There may be a step of generating one or more onboard filter parameters based upon an analysis of flight conditions derived from the avionics data. The method may also include applying a variable filter to the stream of avionics data to generate a filtered avionics data stream. The variable filter may be based upon the one or more onboard filter parameters. There may also be a step of transmitting the filtered avionics data stream to a remote monitoring station.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of systems for secure wireless vehicle parameter data streaming. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
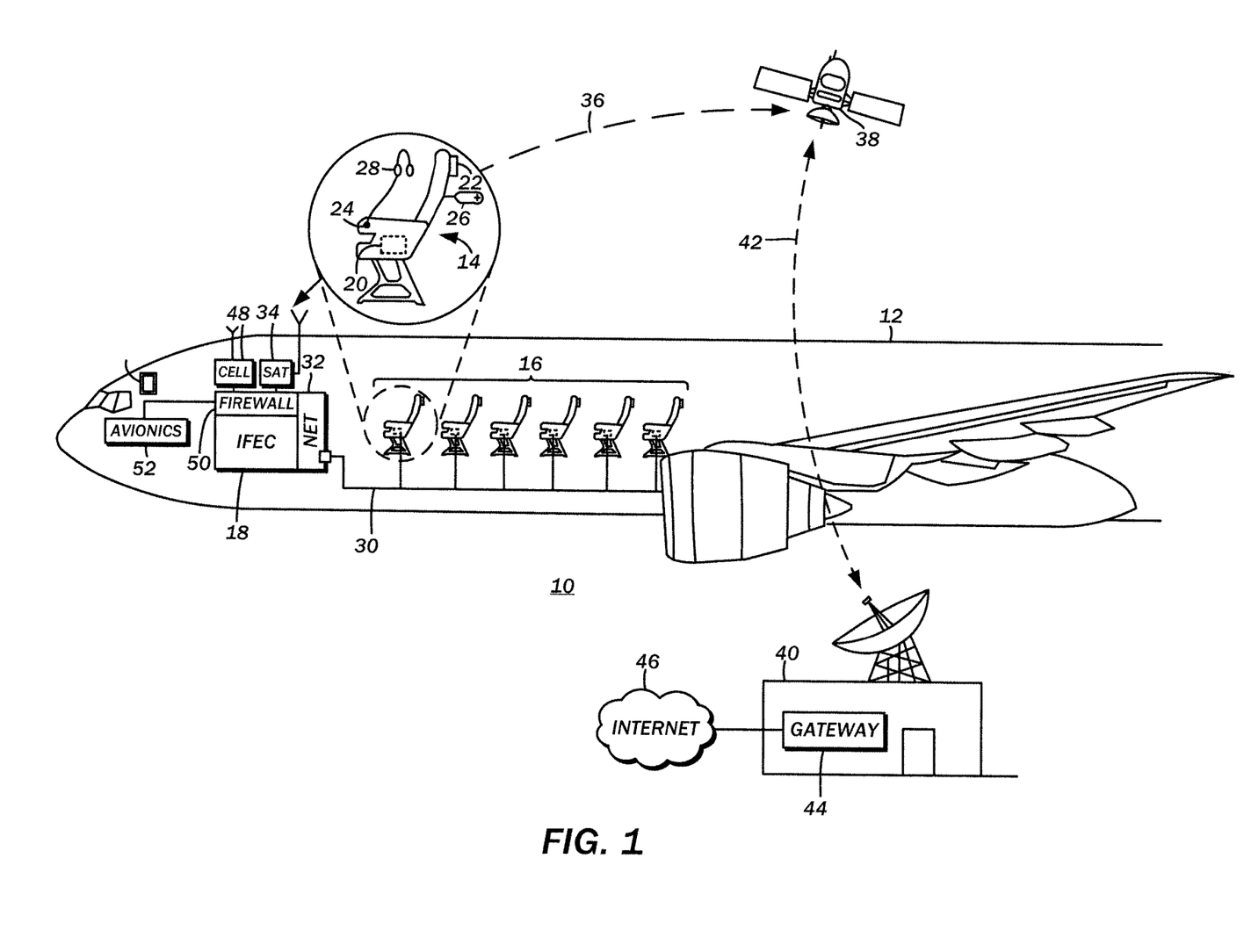
FIG. 1 is a diagram illustrating an environment in which the presently disclosed system for secure wireless vehicle parameter streaming may be implemented.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with each seat 14 accommodating a single passenger. Although the features of the present disclosure will be described in the context of the aircraft 10, this is by way of example only and not of limitation. The presently disclosed system for conversion of data over wireless networks may be utilized in any other context as appropriate, such as, by way of non-limiting illustrative example, the disclosed system may be used on busses, trains, ships, and other types of vehicles.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14 or by mounting on a bulkhead.

The display 22 is understood to be a conventional liquid crystal display (LCD) screen or other type with a low profile that is suitable for installation on the seatback. Each passenger can utilize an individual headset 28, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including two or three sockets or a standard audio output without noise canceling. In alternate embodiments, each display 22 may incorporate a terminal unit 20 to form a display unit referred to in the art as a smart monitor.

A common use for the terminal unit 20 installed on the aircraft is the playback of various multimedia content. The terminal unit 20 may be implemented with a general-purpose data processor that decodes the data files corresponding to the multimedia content and generates video and audio signals for the display 22 and the audio output 24, respectively. The multimedia content data files may be stored in one or more repositories associated with the IFEC system 18, and each of the terminal units 20 for each seat 14 may be connected thereto over a local area network 30, one segment of which may preferably be Ethernet. The IFEC system 18 thus includes a data communications module 32, e.g., an Ethernet data communications module such as an Ethernet switch or router.

One of the functions of the IFEC system 18 is to deliver multimedia content data requested by the passenger via the terminal unit 20. This multimedia content data may include movies, television shows, music, and so forth, and is understood to be stored in a database that is part of the IFEC system 18. Additional software modules are understood to be incorporated into the IFEC system 18, including a streaming server that retrieves the multimedia content from the database for transmission to the requesting terminal unit 20. There may also be a cataloging/menu application with which the user interacts to select the desired multimedia content. Those having ordinary skill in the art will recognize the additional hardware and software features that may be incorporated into the IFEC system 18 to provide passengers greater utility and entertainment.

The IFEC system 18 may also offer Internet access to the connecting terminal units 20 or any device, such as a PED connecting to the local area network 30. One contemplated modality that operates with the IFEC system 18 is a satellite module 34 that establishes a data uplink 36 to a communications satellite 38. According to one exemplary embodiment, the data uplink 36 may be Ku-band microwave transmissions. However, any suitable communications satellite 38, such as Inmarsat or Iridium may also be utilized without departing from the present disclosure. The data transmitted to the communications satellite 38 is relayed to a satellite communications service provider 40. A data downlink 42 is established between the communications satellite 38 and the satellite communications service provider 40 that, in turn, includes a network gateway 44 with a connection to the Internet 46. In another embodiment, the aircraft 10 can be equipped with a cellular modem 48 instead of, or in addition to the satellite module 34 for remote connectivity.

The terminal unit 20 is understood to connect to the IFEC system 18 via the local area network 30 established by the data communications module 32, which relays the data transmissions to the satellite module 34. The data is transmitted to the communications satellite 38 over the data uplink 36, and the communications satellite 38 relays the data to the satellite communications service provider 40 over the data downlink 42. The network gateway 44 then routes the transmission to the Internet 46. Due to the high costs associated with the communications satellite 38 that is passed to the users of the data uplink 36 and the data downlink 42, carriers may limit data traffic to and from the satellite module 34 with a firewall 50, also referred to herein as a network access controller.

The foregoing arrangement of the IFEC system 18, along with its constituent components, have been presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

The present disclosure contemplates the collection and streaming of aircraft operational parameters with the IFEC system 18, and in accordance with one embodiment, the use of a conventional Quick Access Recorder (QAR) is unneeded. The aircraft 10 is comprised of multiple independent systems, and the IFEC system 18 discussed above is one such independent system. Separate from the IFEC system 18 is an avionics system 52, which is understood to encompass the electronics system for the flight controls of the aircraft 10, along with communications with air traffic control and airline operations, ground-based and satellite-based navigation systems, flight management/monitoring systems, collision avoidance systems, flight recorders, and weather systems.

Figure 2:
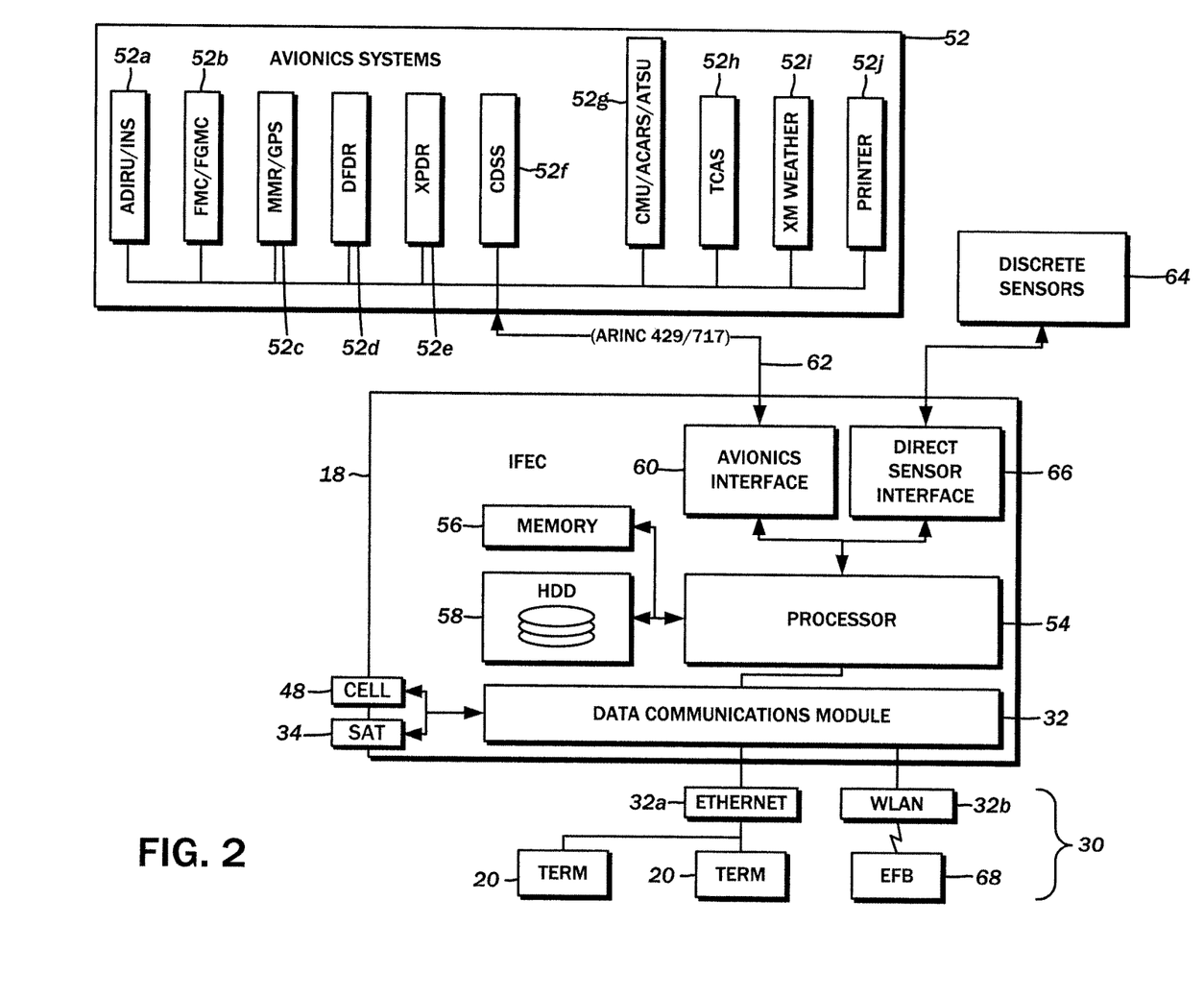
FIG. 2 is a block diagram of an exemplary in-flight entertainment and communications (IFEC) computer system configured for secure wireless vehicle parameter streaming in accordance with the present disclosure.

Referring to the block diagram of FIG. 2, additional details of the hardware components of the IFEC system 18 that may be utilized in connection with the system for streaming aircraft parameter data is illustrated. In general, the IFEC system 18 is a computer or data processing device that executes pre-programmed instructions to generate outputs in response to inputs. Accordingly, there is a processor 54, as well as a memory 56 in which such instructions are stored. As indicated above, the IFEC system 18 streams multimedia content to the terminal units 20, and so the multimedia content data may be stored on a hard disk drive 58 or other permanent storage device such as solid state drives, optical drives, and so forth. The hard disk drive 58 may also be utilized for storing data aircraft data as received from the avionics systems 52. Alternatively, the IFEC system 18 may be connected to a separate network storage server over the local area network 30, in which case a directly installed hard disk drive 58 may not be needed.

The processor 54 manages the operation of the data communications module 32 which includes an Ethernet interface 32a. In addition to Ethernet, the data communications module 32 may incorporate WLAN interface, e.g., an 802.xx wireless local area network interface 32b or access point that can communicate wirelessly with various WLAN-enabled personal electronic devices such an electronic flight bag 68. Additional upstream network links established by the satellite module 34 and the cellular modem 48 are also understood be part of the local area network 30.

The IFEC system 18 contemplated in accordance with the present disclosure also includes an avionics interface 60 that is connectible to the avionics systems 52 over an avionics data bus 62. As shown in FIG. 2 and considered herein, the avionics systems 52 collectively refers to a plurality of avionics systems utilized in the aircraft 10 that are specific to the various functional features thereof. These different systems are understood to output certain data, and are receptive to certain data/commands from external sources.

One such system is an Air Data Inertial Reference Unit (ADIRU)/Inertial Navigation System (INS) 52a that outputs fundamental flight dynamic information including airspeed, angle of attack, altitude, position, and attitude. It is understood that this data is generated by a component known in the art as an air data module (ADM) that converts the electronic sensor measurements from a Pitot tube or static port.

Another avionics system is a Flight Management Computer (FMC)/Flight Guidance Management Computer (FGMC) 52b. The FMC/FGMC 52b performs in-flight management of the flight plan, and utilizes various other avionics systems to ascertain position to provide guidance to the aircraft 10 to conform to the flight plan. A typical flight plan is developed from information in a navigation database, including origin and destination airports and runways, waypoints/intersections, airways, radio navigation aids along the flight path, standard instrument departure procedures, standard terminal arrival routes, holding patterns, and instrument approach procedures.

Yet another avionics system is a Multi-Mode Receiver (MMR)/Global Positioning System (GPS) 52c, which integrates receivers for various terrestrial navigation systems and the satellite-based GPS route navigation system. Among the typical terrestrial radio navigation systems are the instrumental landing system (ILS), microwave landing system (MLS), and VHF omnidirectional range (VOR)/Distance Measuring Equipment (DME). In addition to route navigation, it is understood that GPS may be utilized for landing navigation, e.g., GLS (GPS Landing System).

The avionics systems 52 also includes a Digital Flight Data Recorder (DFDR) 52d, which are used to record all detectable aircraft parameters and control inputs throughout all phases of flight. This is understood to encompass control and actuator positions, engine information, navigational/position information, and other data from each of the avionics systems 52 that are collected by the Flight Data Acquisition Unit.

The typical aircraft 10 also includes a transponder 52e, which transmits identifying information in response to an interrogating signal. The transponder 52e is thus an additional avionics system, and operational information therefrom is understood to be reported to the IFEC system 18 for relaying to the electronic flight bag 68.

With heightened security requirements in which entry into the cockpit during flight is restricted, a Cockpit Door Surveillance Systems (CDSS) 52f may be installed on commercial aircraft. Those requesting entry into the cockpit are monitored with video cameras, the feeds from which are shown in the cockpit and recorded.

Typically, the foregoing avionics systems 52a-52f only output operational information, and are not configured to receive commands from external sources. Any inputs/commands are limited to those provided from within the context of the avionics system. There are avionics systems 52 that may be configured for bi-directional communications with external sources, however. The present disclosure accordingly envisions the data communications module 32 being bi-directional.

One such system that utilizes bi-directional communications over the avionics data bus 62 is a Communications Management Unit (CMU)/Aircraft Communications Addressing and Reporting System (ACARS)/Air Traffic Service Unit (ATSU) 52g that enables various messaging features between the aircraft 10 and various ground stations, including air traffic control, aeronautical operational control, and airline administrative control. Information that is needed immediately during flight but are relatively short such as final aircraft load data, weather and NOTAM information, passenger service-related information and so on are suited for delivery via these communications modalities. The messages received by the CMU/ACARS/ATSU 52g may be relayed to external sources, and is also receptive to messages generated from external sources for transmission by the CMU/ACARS/ATSU 52g.

Another avionics system capable of bi-directional communications with the IFEC system 18 is a Traffic Alert and Collision Avoidance System (TCAS) 52h, which monitors the surrounding airspace for other aircraft to reduce mid-air collisions. The TCAS 52h serves alert and advisory functions that operates by scanning for corresponding transponders on nearby aircraft and instructing the conflicting aircraft toward opposing directions.

Bi-directional communications with the IFEC system 18 is also contemplated for a satellite weather system 52i, which provides interactive graphical weather updates in the form of radar images, satellite images, lightning alerts, METAR weather reports, freezing levels, and so forth. Via the onboard unit, the pilot can interact with the display to retrieve selected weather information for the current or other locations. The same queries can be generated from the electronic flight bag 68 for displaying the information thereon.

Notwithstanding the efforts towards paperless cockpits, the information from the various avionics systems 52 may be best presented and shared amongst the flight crew via paper copies generated by an on-board printer 52j. The communications between the on-board printer 52j and the IFEC system 18 may be bidirectional so that print jobs can be sent from a connected computer system, and status updates can be sent in response thereto.

The description of the various avionics systems 52a-52j is understood to be by way of example only and not of limitation. The IFEC system 18 need not be connected to each and every one, and other avionics systems not expressly mentioned herein may be connected to the IFEC system 18. Those having ordinary skill in the art will recognize the types of data that may be communicated between such avionics systems 52 and the IFEC system 18.

According to various embodiments of the present disclosure, each of the aforementioned avionics systems 52a-52j may have a physical and electrical interface conforming to the ARINC 429 standard. In accordance therewith, the avionics data bus 62 is a two-wire twisted pair electrical connection with balanced differential signaling. Those having ordinary skill in the art will recognize the port configuration requirements as well as the datagram structures for conformity to the standard, and will be omitted for the sake of brevity. The use of ARINC 429 is by way of example only, however, and so the avionics data bus 62 may implement other connectivity standards such as RS-232, RS-422, ARINC-717, and so forth. The higher level data exchange protocols implemented by the avionics systems 52 may be defined in accordance with ARINC 834, and may include GAPS (Generic Aircraft Parameter Service) that is based on the Simple Network Management Protocol (SNMP), STAP (Simple Text Avionics Protocol), and ADBP (Avionics Data Broadcast Protocol) that utilizes eXtensible Markup Language (XML)-based messaging.

In addition to the avionics systems 52 connected to the IFEC system 18 via the avionics data bus 62, the connection of discrete sensors 64 of the aircraft 10 such as weight on wheels sensors, door sensors, engine start lever sensors, brake sensors, and the like. Furthermore, the location identifier may likewise be directly reported to the IFEC system 18. Accordingly, the IFEC system 18 may include a direct sensor interface 66 that is connectible to the discrete sensors 64, and is receptive to the sensor signals generated thereby. In some cases, the sensor signals may be analog with different levels representing different conditions. The direct sensor interface 66 thus quantizes the signal into digital numerical values. Alternatively, the sensor signals may already be in digital form. The direct sensor interface 66 is also connected to and controlled by the processor 54, with the processor 54 generating sensor data objects that are representative of the sensor signals.

Still referring to the block diagram of FIG. 2, the processor 54 is connected to the avionics interface 60, and as indicated above, to the data communications module 32. The processor 54 parses the avionics data which may be structured in accordance with the aforementioned ARINC 834 protocol as received by the avionics interface 60. As described in U.S. Pat. App. Pub. No. 2018/0007137 by Watson, et al., the entirety of the disclosure which is hereby incorporated by reference, such avionics data may be saved to the electronic flight bag 68, which may be configured for handling messages structured according to the predetermined protocol, e.g., the ARINC 834 protocol. The data directly derived from the discrete sensors 64 may be similarly structured in accordance with the ARINC 834 protocol.

Beyond saving the avionics data to an onboard device such as the electronic flight bag 68, various embodiments of the present disclosure contemplate securely streaming the avionics data to a ground station to facilitate aircraft maintenance, route improvements, and incident analysis. No additional equipment beyond the IFEC system 18 is envisioned to be necessary.

Figure 3:
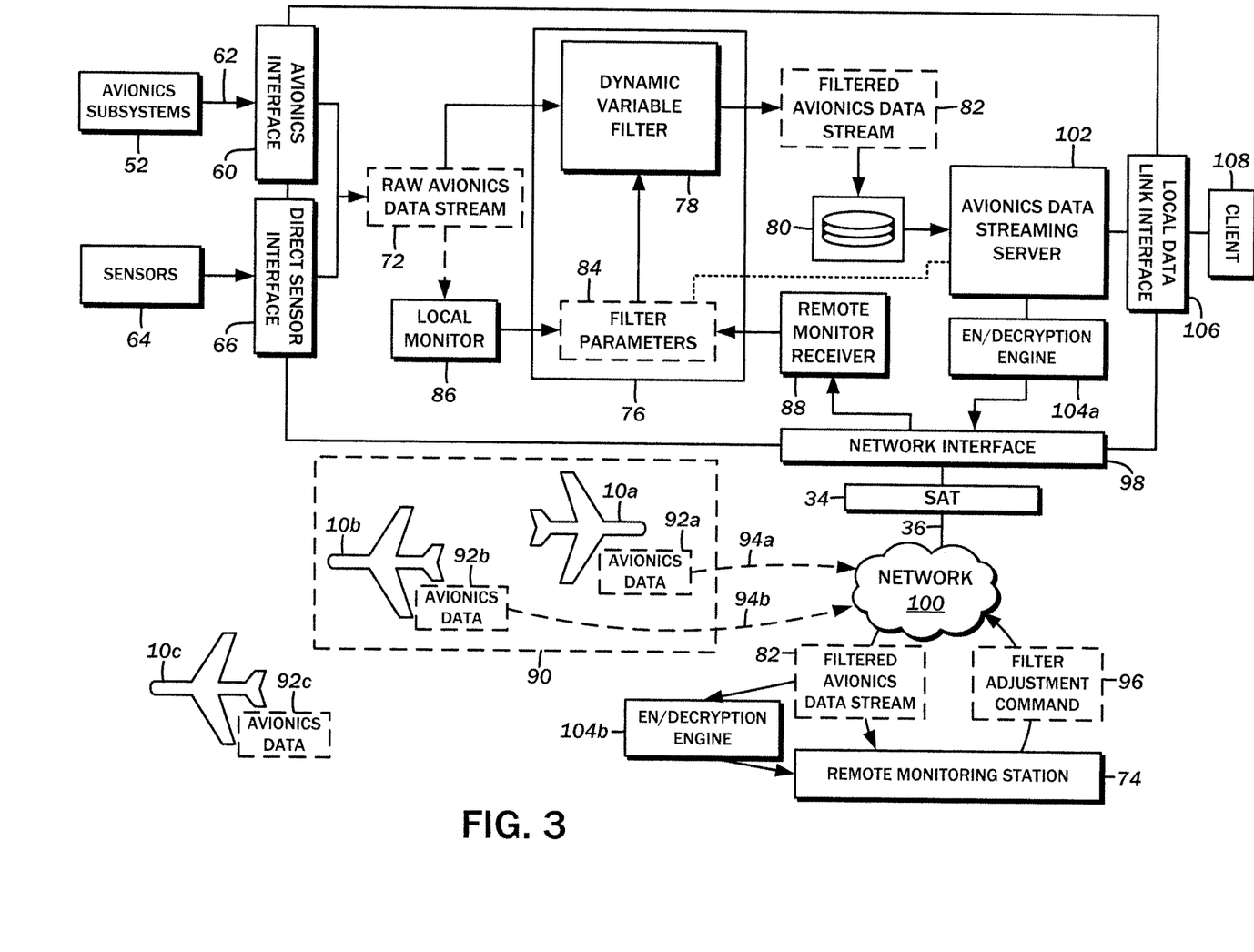
FIG. 3 is a block diagram of a system for streaming vehicle operational parameters from vehicle subsystems according to one embodiment of the present disclosure.

With reference to the block diagram of FIG. 3, a system 70 for streaming vehicle operational parameters from vehicle subsystems may be incorporated into the IFEC system 18 as discussed above. The aircraft 10 is understood to incorporate a variety of avionics systems 52, which may be more generally referred to as vehicle subsystems. The system 70 includes an avionics interface 60, or more generally, a vehicle subsystems interface to which the avionics systems 52 is connected, also as described above. The avionics interface 60 is understood to define a node of the avionics data bus 62. The avionics interface 60 also manages and controls the operation of its hardware counterpart, which is connected to the various avionics systems 52 as described above. In the exemplary embodiment, the remote nodes of the avionics systems 52, e.g., the data sources, implement the higher level data exchange protocols as defined under the ARINC-429 standard. The avionics interface 60, then, is understood to likewise implement the data exchange protocols of the ARINC-429 standard so that its data frame/message contents can remain intact. The vehicle operational parameters, that is, the aircraft operational parameters, are generated by the avionics system 52 and aggregated into a raw avionics data stream 72 comprised of chronologically sequenced data elements of the aircraft operational parameters. Because the specific datagram structures are known in the art and defined by the relevant ARINC standard, no additional details thereof will be described herein.

The discrete sensors 64 may also be utilized by the system 70, so there is the direct sensor interface 66 that is connected to one or more discrete sensors 64. The data provided at the direct sensor interface 66 may be incorporated into the raw avionics data stream 72, though the specific way in which it is processed and used may vary.

The embodiments of the present disclosure contemplate a considered reduction in the amount of data otherwise included in the raw avionics data stream 72 before relaying the same to a ground-based remote monitoring station 74. In this regard, the system 70 includes a recording controller 76 with a dynamic variable filter 78, both of which may be implemented as a series of software modules, though this is by way of example only and not of limitation. The recording controller 76 is connected to a data storage device 80, which may be the aforementioned hard disk drive 58 of the IFEC system 18. Alternatively, the data storage device 80 may be another mass storage device independent of the IFEC hard disk drive 58. The recording controller 76 is also connected to the aforementioned vehicle subsystem interface, e.g., the avionics interface 60 and/or the direct sensor interface 66 to receive vehicle operational parameters therefrom in the form of the raw avionics data stream 72.

The dynamic variable filter 78 of the recording controller 76 is understood to selectively pass, or otherwise output a filtered avionics data stream 82 comprised of selected data of different aircraft operational parameters that are derived from the raw avionics data stream 72. The filtered avionics data stream 82 may be aggregated in the data storage device 80 for subsequent transmission to the remote monitoring station 74, though it is also possible to begin transmission immediately following the filtering process, or at least shortly thereafter.

According to one embodiment, the dynamic variable filter 78 limits the aircraft operational parameter data for storage or streaming in response to detecting a significant change or anomaly thereof. Thus, a more efficient use of the limited satellite uplink bandwidth is contemplated, with only notable data being transmitted. The specifics of which of the aircraft operational parameter data elements to be recorded and/or transmitted is defined by one or more filter parameters 84. In general terms, the filter parameters 84 govern the selection of particular aircraft operational parameters, as well as the sampling or acquisition frequency of those selected aircraft operation parameters. Furthermore, the filter parameters 84 define the threshold values that set the beginning and the end of sampling or acquisition.

More particularly, the filter parameters 84 restrict the filtered avionics data stream 82 from the raw avionics data stream 72 according to a pass condition. The pass condition may be a specific category of aircraft operational parameters, a "record" flag that designates a given one of the aircraft operational parameters to be recorded, and a "transmit" flag that similarly designates a given one of the aircraft operational parameters to be transmitted. Another contemplated filter parameter 84 modifies the capture rate for the filtered avionics data stream 82, while another filter parameter 84 sets the upper and/or lower boundaries of the value for a given one of the aircraft operational parameters that would begin or stop its inclusion of the corresponding value into the filtered avionics data stream 82. Thus, the filters, as implemented by the dynamic variable filter 78 and as further defined by the filter parameter 84, associate measured avionics data, the frequency for reporting the monitored data, and the threshold values for when the monitored data is transmitted offboard. Those having ordinary skill in the art will recognize the various ways in which filtering of a data stream can be implemented, in particular those that may be configured to accept different filtering parameters.

The filter parameters 84 may be adjusted by a local monitor 86 that is in communication with the filter 78. Like the aforementioned recording controller 76, the local monitor 86 may be implemented as one or more software modules comprising instructions executed by the processor 54. An adjustment may be applied in response to an event condition detected by the local monitor 86. In this regard, the local monitor 86 is receptive to and processes the raw avionics data stream 72 to detect the aforementioned anomaly conditions that, according to the embodiments of the present disclosure, warrant capturing the aircraft operational parameter data at a greater frequency, at wider ranges, and so forth.

By way of example, during periods of turbulence, a pertinent set of aircraft operational parameter data is transmitted to the remote monitoring station 74 at a greater rate. In another example, when certain aircraft sensors 64 are activated, detecting such situations as smoke within the cabin, fasten seat belt lights being on, or when cabin decompression is detected, all aircraft operational parameter data may be transmitted to the remote monitoring station 74 for subsequent incident analysis. Another exemplary filter parameter 84 may limit the transmission of variations in wind vectors only when they exceed thresholds that vary according to the phase of flight. Again, the foregoing monitoring of the raw avionics data stream 72 and deriving the filtered avionics data stream 82 is understood to provide more efficient use of the data uplink 36 bandwidth, with only the most important or notable data being transmitted. Those having ordinary skill in the art will be able to readily define additional filter parameters 84 based on other flight conditions.

The filter parameters 84 may also be adjusted by a remote monitor receiver 88 that is in communication with the filter 78. The remote monitor receiver 88 may also be implemented as one or more software modules comprising instructions executed by the processor 54. It is contemplated that the filtering applied by the recording controller 76 be based upon information beyond just the aircraft 10 on which the system 70 resides, and extend to other aircraft operating within a predefined vicinity 90.

As illustrated, there may be a first aircraft 10*a* that reports its own avionics data stream 92*a* to the remote monitoring station 74 via a satellite or other data transmission link 94*a*. Within the same vicinity 90 there may be a second aircraft 10*b* that likewise reports its own avionics data stream 92*b* to the remote monitoring station 74 over the data transmission link 94*b*. For example, if the first or second aircraft 10*a*, 10*b* reports to the remote monitoring station 74 eventful avionics data that warrants closer monitoring, the filter parameters 84 may be revised, and thresholds for when data is reported, the frequency of data acquisition, sampling, or reporting maybe adjusted. More particularly, based upon the detection of certain flight or operational conditions of those first and second aircraft 10*a*, 10*b* that are operating within the same region as the aircraft on board which the system 70 is installed, the remote monitoring station 74 can generate a filter adjustment command 96 that is transmitted to the system 70, and specifically its network interface 98. The remote monitoring station 74 may include a filter analyzer that implements a similar analysis function as performed by the local monitor 86 to derive or generate the filter adjustment command 96 using the incoming avionics data streams 92. From there, the filter adjustment command 96 is relayed to the remote monitor receiver 88 where it is executed, and the filter parameter 84 is modified accordingly.

The remote monitoring station 74 may receive an avionics data stream 92*c* from a third aircraft 10*c* that is operating outside of the predefined vicinity 90, but it may not be considered, or weighted less than the conditions detected based upon the first and second avionics data stream 92*a*, 92*b*. The distance threshold for defining the vicinity 90 is understood to be configurable, and set at the remote monitoring station 74. Various embodiments contemplate a direct point-to-point link with the corresponding network interfaces of the aircraft 10 and the remote monitoring station 74, though such data communications links may collectively define a network 100. In some respects, although the monitoring and processing of the avionics data streams 92 is understood to be taking place at the ground-based remote monitoring station 74, the fact that such avionics data streams 92 are being uploaded to a network server or "cloud," the system may be referred to as a "cloud-based" monitor.

The filter parameters 84 thus updated by the remote monitor receiver 88 may result in a revised filtered avionics data stream 82. The configuration of the filter parameters 84 in the recording controller 76 may be updated throughout the flight, and be reset to the default configuration at the conclusion of the flight or upon detection of an activation of the weight-on-wheels sensor. However, this is by way of example only, and any other update/reset procedure with respect to the filter parameters 84 may be substituted.

Once the filtered avionics data stream 82 is recorded to the data storage device 80 one possibility is the transmission of the same to the remote monitoring station 74 as briefly mentioned above. This may be performed by an avionics data streaming server 102, also referred to herein as a vehicle parameter streaming server. The avionics data streaming server 102 may be implemented as a software module comprised of instructions executed by processor 54 of the IFEC system 18. As shown, the avionics data streaming server 102 is connected to the data storage device 80 and the network interface 98, so that it can retrieve the stored filtered avionics data stream 82 from the data storage device 80. From the network interface 98, the filtered avionics data stream 82 is passed to the satellite module 34, though alternative embodiments also contemplate the use of the cellular modem where the aircraft 10 is on the ground and can connect to terrestrial cellular data networks.

The recorded operational parameter data is understood to be sensitive, so various embodiments of the present disclosure contemplate securing the same. The system 70 includes an encryption/decryption engine 104*a* that encrypts all data traffic originating from the avionics data streaming server 102 destined for the remote monitoring station 74. At the remote monitoring station 74, there is a counterpart encryption/decryption engine 104*b* that decrypts the encrypted incoming data traffic from the avionics data streaming server 102. One implementation of the encryption/decryption engine 104 utilizes standard data encryption techniques such as IPSec Virtual Private Networks (VPNs) for continuous streams, along with AES256 for file delivery. These modalities may involve the installation of encryption keys, certificates, and the like, and those having ordinary skill in the art will recognize suitable configurations for encrypting the data traffic to and from the aircraft 10.

Besides the satellite and other wide area network data transmission modalities discussed above, the present disclosure also contemplates the use of local area connections such as direct wired links and short range wireless communication systems such as WiFi. As shown in the block diagram of FIG. 3, a local data link interface 106 is also connected to the avionics data streaming server 102. The local data link interface 106 may be a directly wired connection such as a Universal Serial Bus (USB) port, the Ethernet interface 32*a* of the IFEC system 18, or an ARINC-717 bus. Alternatively, the local data link interface 106 may be the WLAN interface 32*b*, in which case, a wireless network is established. A client device 108 may be connected to any one of these local data link interfaces 106 to retrieve the filtered avionics data stream 82 stored on the data storage device 80 via the avionics data streaming server 102. The client device 108 may be the aforementioned electronic flight bag, such as the webFB electronic flight bag product that is attachable to a 717 maintenance connector and wirelessly associated to the WLAN interface 32*b* of the IFEC system 18. With respect to security, standard wireless encryption along the lines of WPA2-Enterprise maybe utilized to secure the data link between the client device 108 and the wireless access point links from the IFEC system 18. While the aircraft 10 is undergoing ground-based maintenance and troubleshooting, the client device 108 may be connected to the local data link interface 106, and the filter parameters 84 may be adjusted to route almost the entirety of the raw avionics data stream 72 thereto. Thus, the aircraft operational parameters may be analyzed in real-time as the various onboard avionics and aircraft systems are investigated.

As mentioned above, the various module of the system 70 such as the recording controller 76, the local monitor 86, the remote monitor receiver 88, and the avionics data streaming server 102, as well as certain aspects of the avionics interface 60, the direct sensor interface 66, and the local data link interface 106 are implemented as software modules/applications with instructions executed by the processor 54. Thus, these components may be integrated into a single unit, e.g., the IFEC system 18. These software instructions may be stored in a non-transitory computer readable medium and may perform various methods of streaming aircraft operational parameters from one or more avionics systems. An exemplary embodiment of these methods will be described with reference to the flowchart of FIG. 4.

Figure 4:
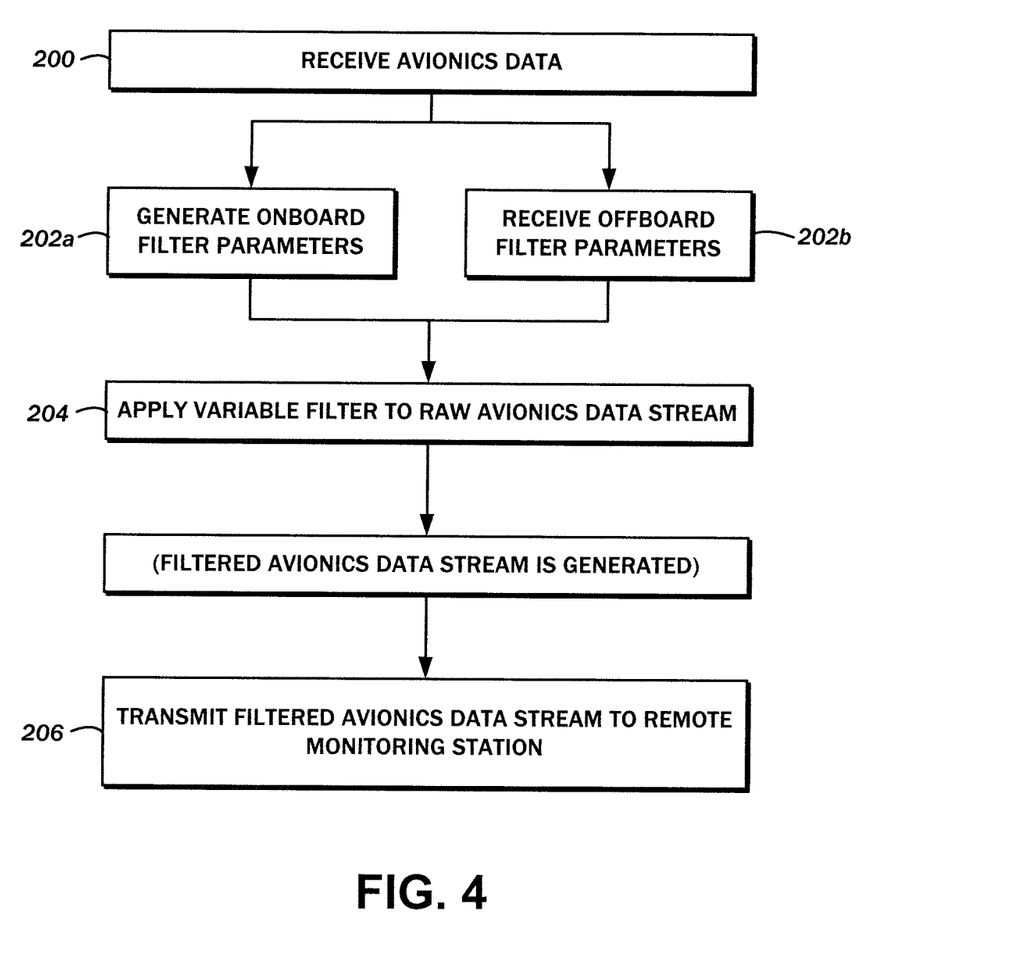
FIG. 4 is a flowchart depicting steps of a method for streaming aircraft operational parameters from one or more avionics systems that may be embodied as a set of executable instructions stored on a non-transitory computer readable medium.

The method begins with a step 200 of receiving the avionics data that is generated by the avionics systems 52, as discussed above. This avionics data is received through an avionics interface 60. Again, the avionics data is understood to be a stream of chronologically sequenced data elements.

The method continues with a step 202*a* of generating one or more onboard filter parameters 84 as set by, for example, the local monitor 86. The filter parameters are understood to be based upon an analysis of flight conditions derived from the avionics data. Alternatively, in a step 202*b*, offboard filter parameters may be received from the remote monitoring station 74, and particularly the remote filter analyzer thereof, mentioned above. It is understood that the offboard filter parameters are generated from the avionics data stream 92 transmitted by other aircrafts 10 in the vicinity, in addition to the aircraft 10 on which the system 70 is installed.

The method continues with a step 204 of applying a variable filter to the raw avionics data stream 72 to generate the filtered avionics data stream 82. The specific filter applied is understood to be based upon the filter parameters 84, which may be defined as offboard or onboard depending on whether the remote monitor receiver 88 or the local monitor 86 generated the same. With the filter applied accordingly, the method proceeds to a step 206 of transmitting the filtered avionics data stream 82 to the remote monitoring station 74.

The particulars shown herein are by way of example only for purposes of illustrative discussion, and are presented in the cause of providing what is believed to be the most useful and readily understood description of the principles and conceptual aspects of the various embodiments of the system for streaming vehicle operational parameters from vehicle subsystems set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An in-flight entertainment and communications (IFEC) system for streaming vehicle operational parameters from vehicle subsystems of a vehicle, the IFEC system comprising:
 a vehicle subsystems interface defining a node of a vehicle data bus, the vehicle subsystems being connectible to the vehicle subsystems interface over the vehicle data bus to transmit vehicle operational parameters thereto as a raw stream of chronologically sequenced data elements;
 a data storage device;
 a recording controller connected to the data storage device and to the vehicle subsystem interface to receive vehicle operational parameters therefrom, the recording controller including a dynamic variable filter selectively passing a filtered data stream of vehicle operational parameters derived from the raw stream to the data storage device for storage thereon, the dynamic variable filter being defined by one or more filter parameters that are based on whether the vehicle is communicating with the remote monitoring station or undergoing ground-based maintenance;
a network interface in communication with a remote monitoring station over a data communications link; and
a vehicle parameter streaming server connected to the data storage device and to the network interface, the filtered data stream of vehicle operational parameters being retrieved from the data storage device for transmission to the remote monitoring station, and the filtered data stream comprising a reduction in an amount of data associated with the vehicle operational parameters compared to the amount of data in the raw stream,
wherein the data storage device stores multimedia content data in addition to storing the filtered data stream of vehicle operational parameters,
wherein the network interface transmits the multimedia content data to one or more terminals in the vehicle in addition to transmitting the filtered data stream to the remote monitoring station,
wherein a filter adjustment command is received at the IFEC system and the network interface from the remote monitoring station based upon a detection of certain eventful avionics data that warrants closer monitoring, the certain eventful avionics data being reported from first and second aircrafts that are operating in a region that is within a distance threshold of the vehicle,
wherein the filter adjustment command is determined without taking into consideration, or by weighting less, eventful avionics data from a third aircraft that is operating outside the region;
wherein the filter adjustment command revises the one or more filter parameters, and adjusts thresholds for when data is reported, a frequency of data acquisition, sampling, or reporting.

2. The system of claim 1, wherein the one or more filter parameters restricts the filtered data stream from the raw stream according to a pass condition, the pass condition being selected from a group consisting of: a specific category of the operational parameters, a record flag being set designating the operational parameter to be recorded, and a transmit flag being set designating the operational parameter to be transmitted to the remote monitoring station.

3. The system of claim 1, wherein the one or more filter parameters modifies a data capture rate.

4. The system of claim 1, wherein the one or more filter parameters sets upper and/or lower boundaries of the value of the vehicle operational parameters.

5. The system of claim 1, further comprising:
a local monitor in communications with the dynamic variable filter of the recording controller, the one or more filter parameters being modified in response to an event condition detected by the local monitor from the vehicle operational parameters.

6. The system of claim 1, further comprising:
a remote monitor receiver in communication with the dynamic variable filter of the recording controller, the one or more filter parameters being modified in response to a filter adjustment command received through the remote monitor receiver.

7. The system of claim 6, wherein the filter adjustment command is generated by a cloud-based monitor receptive to vehicle operational parameters from a plurality of vehicles, the filter adjustment command being based upon vehicle operational parameters of the plurality of vehicles.

8. The system of claim 1, further comprising:
a vehicle sensor interface directly connected to one or more of the vehicle subsystems, the vehicle sensor interface being receptive to a sensor signal output by the vehicle subsystems with corresponding vehicle operational parameters being generated to the recording controller in response.

9. The system of claim 1, further comprising:
a local data link interface in communication with the vehicle parameter streaming server, a data processing device being directly connectible to the local data link interface to retrieve the vehicle operational parameters stored on the data storage device.

10. The system of claim 1, wherein the data communications link is carried over a communications satellite to a satellite ground station, the remote monitoring station being communicatively linked with the satellite ground station.

11. An in-flight entertainment and communications (IFEC) system of an aircraft configured to stream vehicle operational parameters from avionics systems connected thereto, the IFEC system comprising:
an avionics interface defining a node of an avionics bus, the avionics systems being connectible to the avionics interface over the avionics bus to transmit aircraft operational parameters thereto as a raw stream of chronologically sequenced data elements;
a data storage device;
a network interface in communication with a remote monitoring station over a network; and
a data processor connected to the avionics interface and the network interface, the data processor being receptive to the aircraft operational parameters from the avionics interface and applying a variable filter selectively passing a filtered data stream of aircraft operational parameters derived from the raw stream to the data storage device for storage thereon, the variable filter being defined by one or more filter parameters dynamically adjustable in response to changing conditions derived from the aircraft operational parameters, the one or more filter parameters being based on whether the aircraft is communicating with the remote monitoring station or undergoing ground-based maintenance, and the filtered data stream being transmitted to the remote monitoring station and comprising a reduction in an amount of data associated with the aircraft operations parameters compared to the amount of data in the raw stream,
wherein the data storage device stores multimedia content data in addition to storing the filtered data stream of aircraft operational parameters, and
wherein the network interface transmits the multimedia content data to one or more terminals in the aircraft in addition to transmitting the filtered data stream to the remote monitoring station,
wherein the network interface transmits the multimedia content data to one or more terminals in the vehicle in addition to transmitting the filtered data stream to the remote monitoring station,
wherein a filter adjustment command is received at the IFEC system and the network interface from the remote monitoring station based upon a detection of certain eventful avionics data that warrants closer monitoring, the certain eventful avionics data being reported from first and second aircrafts that are operating in a region that is within a distance threshold of the vehicle,
wherein the filter adjustment command is determined without taking into consideration, or by weighting less, eventful avionics data from a third aircraft that is operating outside the region;

wherein the filter adjustment command revises the one or more filter parameters, and adjusts thresholds for when data is reported, a frequency of data acquisition, sampling, or reporting.

12. The IFEC system of claim 11, further comprising:
a direct sensor interface connectable to one or more aircraft sensors and receptive to sensor signals generated by the one or more aircraft sensors.

13. The IFEC system of claim 11, wherein the one or more filter parameters is modified in response to an event condition detected from the aircraft operational parameters.

14. The IFEC system of claim 11, wherein the one or more filter parameters is modified in response to a filter adjustment command received from the remote monitoring station.

15. The IFEC system of claim 14, wherein the filter adjustment command is based upon aircraft operational parameters of a plurality of vehicles connected to a cloud-based monitor of the remote monitoring station.

16. A non-transitory computer readable medium connected to an in-flight entertainment and communications (IFEC) system of an aircraft and including instructions executable by the IFEC system for performing a method of streaming aircraft operational parameters from one or more avionics systems, the instructions comprising:
instructions for receiving avionics data generated by the one or more avionics systems from an avionics interface to which the one or more avionics systems are connected, the avionics data being received as a stream of chronologically sequenced data elements;
instructions for generating one or more onboard filter parameters based upon an analysis of flight conditions derived from the avionics data;
instructions for applying a variable filter to the stream of avionics data to generate a filtered avionics data stream, the variable filter being based upon the one or more onboard filter parameters that are based on whether the aircraft is communicating with a remote monitoring station or undergoing ground-based maintenance; and
instructions for transmitting, using a network interface, the filtered avionics data stream from a data storage device on the IFEC system to the remote monitoring station, the filtered avionics data stream comprising a reduction in an amount of the avionics data compared to the amount of avionics data in the stream of avionics data,
wherein the data storage device stores multimedia content data in addition to storing the filtered avionics data stream, and wherein the network interface transmits the multimedia content data to one or more terminals in the aircraft in addition to transmitting the filtered avionics data stream to the remote monitoring station, wherein the network interface transmits the multimedia content data to one or more terminals in the vehicle in addition to transmitting the filtered data stream to the remote monitoring station, wherein a filter adjustment command is received at the IFEC system and the network interface from the remote monitoring station based upon a detection of certain eventful avionics data that warrants closer monitoring, the certain eventful avionics data being reported from first and second aircrafts that are operating in a region that is within a distance threshold of the vehicle, wherein the filter adjustment command is determined without taking into consideration, or by weighting less, eventful avionics data from a third aircraft that is operating outside the region;

wherein the filter adjustment command revises the one or more filter parameters, and adjusts thresholds for when data is reported, a frequency of data acquisition, sampling, or reporting.

17. The non-transitory computer readable medium of claim 16, further comprising:
instructions for receiving one or more offboard filter parameters from a remote filter analyzer, the offboard filter parameters being generated from avionics data received by the remote filter analyzer from a plurality of aircraft and the variable filter further being based upon the one or more offboard filter parameters.

18. The non-transitory computer readable medium of claim 16, wherein the one or more onboard filter parameters restricts the filtered avionics data stream to a pass condition, the pass condition being selected from a group consisting of: a specific category of the aircraft operational parameters, a record flag being set designating the avionics operational parameter to be recorded, and a transmit flag being set designating the avionics operational parameter to be transmitted to the remote monitoring station.

19. The non-transitory computer readable medium of claim 16, wherein the one or more onboard filter parameters modifies a data capture rate.

20. The non-transitory computer readable medium of claim 16, wherein the one or more onboard filter parameters sets upper and/or lower boundaries of the value of the aircraft operational parameters.

* * * * *